March 20, 1928.
C. B. COMSTOCK
BAKER'S OVEN
Filed Aug. 5, 1925
1,663,116
2 Sheets-Sheet 1
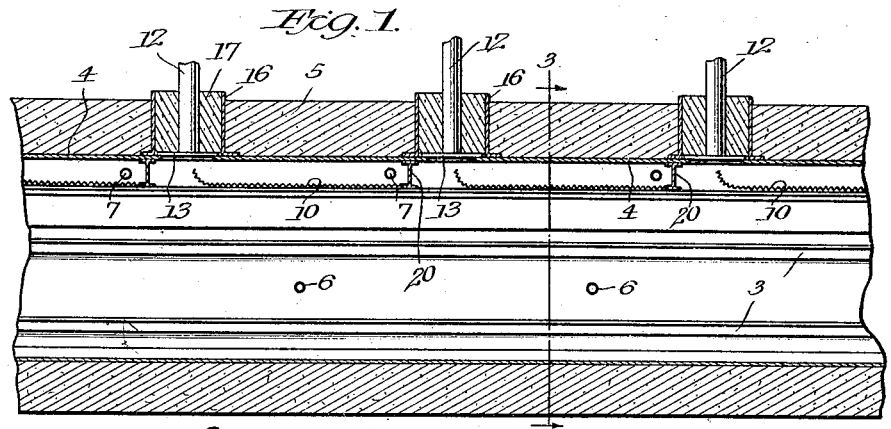
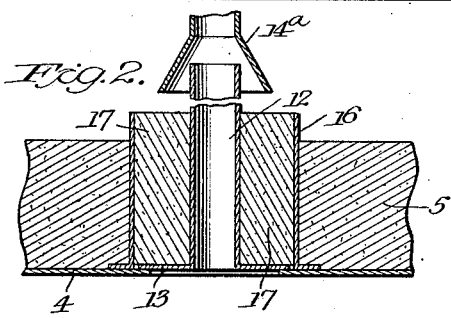
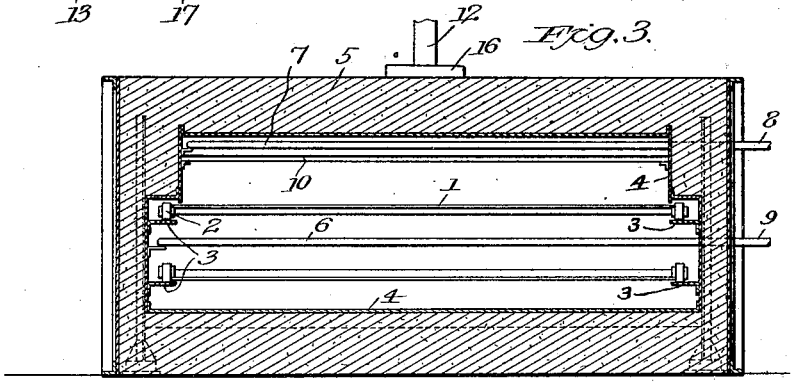
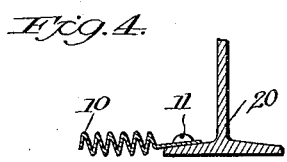
Inventor
Corry B. Comstock

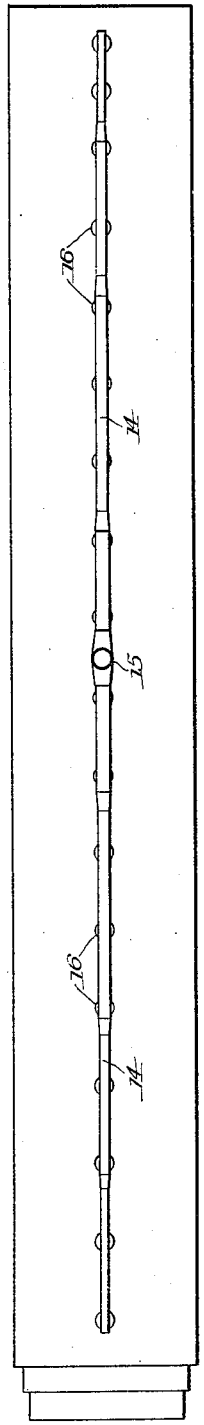
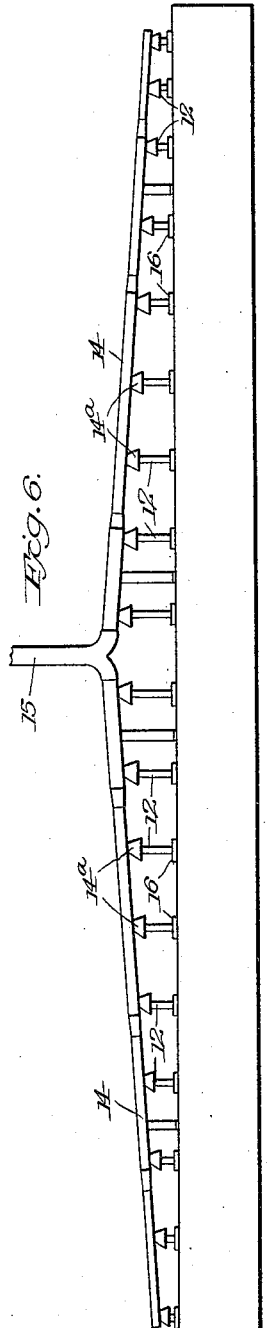

Patented Mar. 20, 1928.

1,663,116

UNITED STATES PATENT OFFICE.

CORRY B. COMSTOCK, OF NEW YORK, N. Y., ASSIGNOR TO COMSTOCK OVEN COMPANY, INC., OF NEW YORK, N. Y., A CORPORATION OF NEW YORK.

BAKER'S OVEN.

Application filed August 5, 1925. Serial No. 48,310.

The present invention relates to improvements in bakers' ovens, particularly of the type in which the articles to be baked are supported on and carried through a baking chamber by a travelling conveyor supported on suitable tracks, and in which the baking chamber is heated by gaseous fuel burners, although some of the features of construction hereinafter described, are applicable for use with ovens, the baking chambers of which may be heated by other mediums.

As heretofore commonly constructed, the baking chambers of ovens of the type referred to have been of substantially uniform width from top to bottom, and experience with such ovens has shown that there is an undesirable accumulation of heat immediately above and adjacent the side edges of the travelling conveyor. This has resulted in subjecting the loaves of bread, or cakes, for example, positioned adjacent the side edges of the conveyor, to overheating. In fact, the articles adjacent the side edges of the conveyor are frequently burned, or overheated, while only the intermediate articles (transversely of the conveyor) are properly baked. This naturally results in a considerable loss of product, and one of the objects of the present improvements is to provide means whereby the heating of the baking chamber will be substantially uniform throughout the width of the travelling conveyor so that the articles adjacent the side walls of the chamber will not receive a materially greater degree of heat than the intermediate ones, transversely of the conveyor.

Further, an object of the present invention is to provide means for efficiently venting the baking chamber from the accumulation of gases escaping from the burners, or undesirable accumulation of vapor produced during the baking operation, and to reduce to a minimum the damage that may result from explosions in the upper portions of the baking chamber.

With the constructions of bakers' ovens commonly employed, explosions frequently occur, due to the accumulation of gases in the upper portions of the chambers, causing great damage to the oven. By the present invention, a means is provided whereby the effect of such an explosion will not be to seriously damage the top of the baking chamber, but will provide for a ready escape of the exploding gases.

Another feature of the present invention is particularly adapted for ovens intended for baking cake, as distinguished from bread.

It is well recognized that in the baking of bread, it is important to maintain about the upper and side surfaces of each loaf a certain body of vapor, containing a considerable percentage of alcohol, generated by the action of heat on the contents of the loaf. The presence of such a body of vapor acts to give a desirable quality and color to the crust, and it is important to protect such body of vapor and the loaves being baked from the direct action of the upper series of burners commonly employed for heating the oven chamber.

In the baking of cake, however, it is preferred that the baking should occur in a relatively dry atmosphere, and that the vapor generated during the baking operation should be allowed to freely escape. This desirable result is very efficiently accomplished by the construction and arrangement of parts that will be hereinafter more particularly described and claimed.

In the accompanying drawings:

Fig. 1 is a longitudinal sectional view through a portion of a baker's oven, constructed in accordance with the present invention.

Fig. 2 is a detail on an enlarged scale, of a portion of the oven top.

Fig. 3 is a transverse vertical section substantially on the line 3—3 of Fig. 1.

Fig. 4 is an enlarged detail of one feature of the improved oven.

Figs. 5 and 6 are, respectively, a plan and side elevation of an oven embodying the present invention.

In the drawings, the parts are shown more or less conventionally and diagrammatical.

It is to be understood, of course, that there can be considerable variation from the details, and changes in the proportions of the parts, illustrated without departing from the scope of the invention, and the drawings are not to be considered as restrictive of the invention, except as details thereof may be specifically referred to in the appended claims.

Referring to the drawings, in the several figures of which corresponding parts are designated by like reference characters, the oven illustrated is of that type in which the walls are formed by suitable metal frames and plates providing an elongated baking chamber, in which is adapted to travel a conveyor 1, the supporting wheels 2 of which are supported by tracks 3, shown as made of angle iron, and suitably secured to opposite side walls of the baking chamber.

Each wall of the baking chamber comprises a metal lining 4 and a body of suitable heat insulating material 5. As shown most clearly in Figure 3, the lower edges of the linings 4 of the side walls of the upper portion of the baking chamber extend downward beyond the lower ends of the adjacent wall portions.

As is customary in bakers' ovens of the type referred to, the baking chamber is heated, and the articles, supported on the upper run of the travelling conveyor 1, baked by gaseous fuel burners 6, 7, which are, respectively, located between the two runs of the conveyor 1 and above said conveyor. Gas for these burners is supplied through pipes 8, 9, extending to the exterior of the oven, and, as usual, automatic feed or fuel supply means may be provided for regulating each of the burners.

Referring to Fig. 3, it will be noted that the side walls of the baking chamber do not extend in the same vertical plane from the bottom to the top of such chamber, but the upper portion of the chamber is considerably narrower than the lower portion, or that in which the travelling conveyor operates. The construction provides each side wall of the oven chamber with shoulders extending throughout the length of the oven chamber immediately above and overhanging both edges of the travelling conveyor.

With structures in which the side walls of the baking chamber are uniformly separated throughout the height of the chamber, it is found that articles on the conveyor adjacent the sides thereof, are subjected to an undesirable degree of heat. It frequently happens that while articles situated at intermediate points transverse of the conveyor are properly baked, the articles situated adjacent the side edges will be rendered worthless by overbaking. This is apparently due to the unavoidable accumulation of heat in the portions of the baking chamber immediately above the side edges of the conveyor.

By making the side walls of the particular form shown in Fig. 3, that is, having shoulders that overhang the side edges of the conveyor, and having side wall linings 4 projecting downward below the lower faces of said shoulders, it has been found that this undesirable overheating of articles along the side edges of the conveyor, is avoided. As shown, the lower edges of the linings 4 of the upper side walls are very close to the horizontal plane of the upper run of the conveyor 1, so that the conveyor wheels 2 travel in spaces which are substantially enclosed above their axes.

In order to protect the articles being baked from the direct action of the upper burners 7, a baffle 10 is interposed between each of said burners and the conveyor 1, said baffle extending, preferably, continuously across the baking chamber.

As shown, the baffles 10 are of corrugated form, the several corrugations being relatively steep and fairly close together, so that a maximum amount of heat radiating surface is provided. The baffles may be of any suitable material, for example the metal known as "Ascoloy." Any so called "high temperature" metal which will not be seriously affected by the temperature or action of the vapors and gases to which it is subjected may be used.

As shown, the baffles are supported at the sides of the oven by suitable brackets or angle iron strips, and one edge of each is fastened as by screws or rivets 11, to the base flange of one of a series of angle iron members 20 that divide the upper section of the baking chamber into a series of spaces each containing one of the upper burners 7.

The baffles preferably do not extend continuously throughout the length of the space separating one partition member 20 from the next, but each is separated by a relatively short space from one of said partitions, and the free end of each is preferably bent or curved upwardly to serve as a guide by which vapor generated from the articles being baked will be directed toward the adjacent one of a plurality of vents which are formed through the top of the baking chamber. The upwardly curved end of each baffle also guides the products of combustion from the burner 7 immediately above each baffle to the associated vent.

The particular shape of baffle referred to effectually prevents direct contact of the products of combustion from the burners 7 with the articles being baked, or the vapors generated by the action of heat on such articles, while the corrugated body provides for a maximum utilization of the heat of such burners.

The vents referred to are, as shown, provided by forming apertures at suitable points in the metal lining 4 of the top of the baking chamber, and placing over each of such openings a vent pipe 12, the lower end of which is provided with an annular flange 13 that contacts with the metal lining 4 about the aperture formed therein.

It will be seen that the upwardly deflected end of each of the baffles 10 terminates substantially in alignment with the adjacent vent tube 12, and, therefore, the vapors and gases from the baking chamber, as well as the products of combustion from the upper burners, will be guided to and caused to escape through said pipes.

The vents are shown as being arranged in a single line throughout the length of the oven, and the outer ends of the pipes 12 communicates with depending branches of conduits or pipes 14 which in turn are connected with a vertical escape stack or duct 15.

The conduits 14 are suitably supported on the oven top, and the depending branches thereof terminate in expanded portions 14ª, each surrounding the upper end of one of the vent pipes 12.

If desired, a suitable suction fan may be connected with the stack 15 to assist in maintaining a slight suction outward through each vent tube 12.

There is no rigid connection between the several vent tubes 12 and the conduits 14 which would interfere with the movement of such tubes in event of an explosion within the baking chamber as is hereinafter referred to.

In order to reduce to a minimum the damage resulting from explosions in the upper portion of the baking chamber, the sections or portions of the oven top are preferably so constructed that the areas thereof immediately adjacent each of the vents referred to, will afford less resistance to an explosive force acting outwardly from the baking chamber than the intermediate portions of said top. That is, each of the vents is preferably surrounded by an area which, in event of an explosion occurring in the baking chamber, will yield and quickly provide an opening of such capacity that the explosion will not act to seriously damage other portions of the oven top.

The portions of restricted resistance referred to may be produced in various ways, but, of course, it is important that care be taken to prevent undesirable escape of heat from the baking chamber during the operation of the oven.

In the embodiment of the invention illustrated, each vent pipe 12 is surrounded by a sleeve 16, the inner end of which is shown as having an annular flange that bears upon the outer surface of the metal lining 4 of the baking chamber. Said sleeves are of a height sufficient to extend through, and preferably slightly above, the top surface of the oven. The space within each sleeve 16 is filled with a body of heat insulating material 17 which rests upon the flange 13 of the vent pipe 12, but is separated by a sleeve 16 from the body of the top of the baking chamber. While the body 17 is of such nature and sufficiently compacted to prevent undesirable escape of heat from the baking chamber, and withstand the relatively slight pressure existing in the baking chamber when the oven is in use, it offers less resistance to an explosive force acting outward from the baking chamber than is provided by the other portions of the top 5. Therefore, in event of an explosion occurring in the baking chamber, the "plug-like" contents of one or more of the sleeves 16 will be displaced providing free escape for the explosion gases and preventing the other portions of the oven top from being damaged.

The importance of dividing the upper portion of the oven chamber into a series of spaces each containing one of the upper burners and communicating with a vent pipe 12 will be appreciated.

In event of a leak from any of the upper burners the gas will be confined within the relatively small space between the partitions 20, instead of spreading throughout the baking chamber, and can escape through the associated vent tube 12.

Gases escaping from the lower burners 6 can, of course, escape freely through the feed or discharge openings in the end walls of the baking chamber through which the travelling conveyor passes or through which articles are deposited on or removed from such conveyor.

I claim:

1. In a baker's oven, the combination of a baking chamber, a travelling conveyor for supporting articles to be baked and transporting them through said chamber, and means for heating the chamber, the opposite side walls of the chamber having portions overhanging the edges of the travelling conveyor and reducing the width of the chamber above the conveyor to less than that of the conveyor.

2. In a baker's oven, the combination of a baking chamber, a travelling conveyor for supporting articles to be baked and transporting them through said chamber, means arranged above and below the upper run of the conveyor for heating the chamber, and means for interrupting the upward passage of heated currents from the lower heating means to the baking chamber above the conveyor between the edges of the conveyor and the side walls of the baking chamber without interfering with the upward passage of such currents at points between the edges of the conveyor.

3. In a baker's oven, the combination of a baking chamber, a travelling conveyor for supporting articles to be baked and transporting them through said chamber, means for heating the chamber, tracks for the conveyor extending longitudinally of the chamber adjacent the side walls thereof, the side walls of the chamber being extended laterally into the chamber above the upper track to points inside the vertical planes of the inner faces of the side walls below said upper track, for the purpose described.

4. In a baker's oven, the combination of a baking chamber which has the lower portions of its side walls spaced apart to a greater extent than the upper portions thereof forming shoulders extending into the chamber, tracks extending along the side walls of the chamber beneath said shoulders formed by the side walls, an endless travelling conveyor supported by the tracks, and heaters arranged above and below the upper run of said conveyor.

5. In a baker's oven, the combination of a baking chamber which has the lower portions of its side walls spaced apart to a greater extent than the upper portions thereof forming shoulders extending into the chamber, tracks extending along the side walls of the chamber beneath said shoulders formed by the side walls, an endless travelling conveyor supported by the tracks, heaters arranged above and below the upper run of the conveyor, and heat deflecting means interposed between the upper heaters and the conveyor.

6. In a baker's oven, the combination of a baking chamber which is provided in its top with a plurality of vents spaced longitudinally of the chamber and has the upper portions of its side walls separated to a less extent than the lower portions thereof forming shoulders extending into the chamber, tracks positioned along the side walls of the chamber beneath said shoulders formed by the side walls, an endless travelling conveyor supported by the tracks, heaters arranged above and below the upper run of the conveyor, and a baffle arranged between each of the heaters above the conveyor and the conveyor for protecting articles on the conveyor from the direct heat of said heaters and acting to guide toward an adjacent vent vapor generated from the articles being baked.

7. In a baker's oven, the combination of a baking chamber, a substantially horizontal support for articles to be baked within the chamber, heating means for the chamber arranged below said support, a heater above said support, and a corrugated metal baffle arranged between said upper heater and the support for protecting articles on the support from the direct action of the heat of said heater.

8. In a baker's oven, the combination of a baking chamber, a substantially horizontal support for articles to be baked within the chamber, heating means for the chamber arranged below said support, a heater above said support, and a corrugated metal baffle extending continuously across the chamber from side to side between said upper heater and the support for protecting articles on the support from the direct action of the heat of said heater.

9. In a baker's oven, the combination of a baking chamber provided with a vent in its top, a substantially horizontal support for articles to be baked within said chamber, means for heating said support from below, a heater above said support, and an imperforate baffle interposed between said burner and support to protect articles on the support from the direct heat of the burner without interfering with free communication between the space immediately below the baffle and the vent in the top of the baking chamber.

10. In a baker's oven, the combination of a baking chamber having therein a substantially horizontal support for articles to be baked, and provided above said support with an outlet or vent for vapor from the baking chamber, a source of heat below said support, a heating burner above the support, and a baffle interposed directly between said burner and the support adapted to shield articles on the support from the direct heat of the burner while permitting free communication between the baking chamber below the baffle and said vent.

11. In a baker's oven, the combination of a baking chamber provided with a substantially horizontal support for articles to be baked and having above said support a plurality of outlets or vents arranged at spaced points longitudinally of the chamber, heating means below the support, a plurality of heating burners above the support, and a plurality of horizontal baffles each adapted to protect articles on the support from the direct heat of one of the burners while permitting free communication between the space immediately below said baffle and the adjacent vent or outlet of the baking chamber, 12. In a baker's oven, the combination of a baking chamber provided in its top with a plurality of outlets or vents arranged at different points longitudinally of the chamber, a substantially horizontal support for articles to be baked within the chamber, heating means below said support, a plurality of heaters above the support, and a baffle arranged between each heater and the support to shield articles on the support from the direct heat of the heater, said baffle having an upwardly deflected end portion for guiding vapor generated in the space immediately below the baffle to the adjacent vent or outlet in the top of the baking chamber.

13. In a baker's oven, the combination of a baking chamber provided with a substantially horizontal support for articles to be baked and having above said support a plurality of outlets or vents for the escape of vapor and gas from the baking chamber, heating means below said support, a plurality of heating burners above the support, and means interposed between each burner and the support adapted to protect articles on the support from the direct heat of the burners and to direct vapor generated from the articles being baked by the action of said burners to the adjacent outlet or vent.

14. In a baker's oven, the combination of a baking chamber provided with a substantially horizontal support for articles to be baked and having in its top wall an outlet or vent for the escape of vapor and gas from the chamber, heating means below said support, a heating burner above the support, and a baffle positioned between said burner and support, whereby articles on the support are protected from the direct action of the burner, one edge of the baffle being bent upward beneath the outlet or vent in the top of the chamber to guide vapor generated beneath the baffle to said outlet or vent.

15. In a baker's oven, the combination of a baking chamber provided with a vent in its top, a substantially horizontal support for articles to be baked within said chamber, means for heating said support from below, a heater above said support, and a corrugated sheet metal baffle interposed between said burner and support to protect articles on the support from the direct heat of the heater without interfering with free communication between the space immediately below the baffle and the vent in the top of the baking chamber.

16. In a baker's oven, the combination of a baking chamber having therein a substantially horizontal support for articles to be baked, and provided above said support with an outlet or vent for vapor from the baking chamber, a source of heat below said support, a heating burner above the support, and a corrugated sheet metal baffle interposed between said burner and the support adapted to shield articles on the support from the direct heat of the burner while permitting free communication between the baking chamber below the baffle and said vent.

17. In a baker's oven the combination of a baking chamber which has the lower portions of its side walls spaced apart to a greater extent than the upper portions thereof forming shoulders extending into the chamber, tracks extending along the side walls of the chamber beneath said shoulders formed by the side walls, an endless travelling conveyor supported by the tracks, heaters arranged above and below the upper run of the conveyor, and a corrugated sheet metal baffle interposed between the upper heaters and the conveyor.

18. In a baker's oven, the combination of a baking chamber having an opening in its top, a vent pipe extending though said opening and having an annular flange about its inner end extending across said opening, and a body of heat insulating material within the space between the vent pipe and the peripheral wall of the opening in the oven top, said material offering less resistance to outward force than the body of the top of the oven surrounding the opening therein.

19. In a baker's oven, the combination of a baking chamber having a plurality of openings in its top, a vent pipe extending through each said opening and provided at its inner end with an annular flange that extends across said opening, a common duct connecting the outer ends of the vent pipes, and a body of heat insulating material within the space between each vent pipe and the peripheral wall of the opening in the oven top within which said pipe is arranged, said material offering less resistance to outward force than the body of the top of the oven surrounding the said openings therein.

20. In a baker's oven, the combination with a baking chamber having a top of suitable material provided with a metal lining, having an aperture formed therethrough, a sleeve surrounding the aperture in the lining of the top of the oven chamber and extending outward through said top, a vent pipe extending through the sleeve and having at its inner end an annular flange that rests on the lining of the top of the baking chamber about the aperture therethrough, and a body of heat insulating material within the space between the vent tube and sleeve, said material offering less resistance to outward pressure than the body of the top surrounding the sleeve.

21. A baker's oven including a baking chamber having a vent opening through its top and provided immediately around said vent with an area adapted to offer less resistance to outward pressure from the baking chamber than the body of said top, for the purpose described.

22. The combination with a baker's oven including a baking chamber having a series of vents extending through the top of the chamber to the exterior of the oven, the portions of the body of the oven through which said vents extend immediately surrounding the vents being constructed to offer less resistance to outward pressure from within the baking chamber than other portions of said body, of a common duct or conduit communicating with all the vents.

23. The combination with a baker's oven including a baking chamber, of an endless travelling conveyor for moving articles through said chamber, heating means below said conveyor, partition-like members at the top of the oven chamber and extending transversely thereof to provide a series of compartments above the conveyor, a burner in each of said compartments, and a baffle adjacent each said compartment for protecting articles on the conveyor from the direct action of said upper burners.

24. The combination with a baker's oven including a baking chamber, of an endless travelling conveyor for moving articles through said chamber, heating means below said conveyor, partition-like members at the top of the oven chamber and extending transversely thereof to provide a series of compartments above the conveyor, a burner in each of said compartments, each of said compartments having a vent opening in its top, and a baffle arranged between each of the burners and the travelling conveyor, said baffle terminating substantially in alignment with the vent in the compartment beneath which it is arranged.

25. The combination with a baker's oven including a baking chamber, of a substantially horizontal support for articles to be baked within said chamber, heating means beneath said support, the space above the support being divided into a plurality of compartments each having a corrugated metal bottom member, and a heater located in each said compartment.

26. The combination with a baker's oven including a baking chamber, of a substantially horizontal support for articles to be baked within said chamber, heating means beneath said support, the space above the support being divided into a plurality of compartments by a series of partitions extending transversely of the baking chamber and a plurality of corrugated metal sheets each attached along one edge to one of the partitions and terminating short of the next partition of the series, each of said compartments being provided with a vent which is in constant communication with the baking chamber through the space separating the free edge of the corrugated bottom of the compartment and the adjacent partition, and a heater in each said compartment.

27. The combination in a baker's oven of a baking chamber having metal side walls, a substantially horizontal support for articles to be baked within said chamber, heating means beneath said support, a series of heaters, spaced longitudinally of the baking chamber, above said support, and a corrugated metal sheet positioned between the support and each of the heaters above the support, substantially as and for the purpose described.

28. The combination in a baker's oven, of a baking chamber having metal side walls, a travelling conveyor for supporting articles to be baked and transporting them through said chamber, heaters positioned below and above the path of articles through the chamber, means interrupting the flow of heated currents between the side walls of the chamber and the edges of the operative run of the conveyor, and corrugated sheet metal baffles arranged between the path of articles being baked and the upper heaters.

29. In a baker's oven, the combination of a baking chamber, a traveling conveyor for supporting articles to be baked and transporting them through said chamber, means arranged above and below the upper run of the conveyor for heating the chamber, and means connected with the side walls of the baking chamber above the upper run of the conveyor for interrupting the passage of heated currents from the lower heating means to the baking chamber above the conveyor past the edges of the conveyor.

30. In a baker's oven, the combination of a baking chamber, a traveling conveyor for supporting articles to be baked and transporting them through said chamber, means for heating the chamber, tracks for the conveyor extending longitudinally of the chamber adjacent the side walls thereof, the side walls of the chamber being extended laterally into the chamber above the upper track, and metal linings on the inner faces of the side walls above the track, the lower edges of said linings extending below the lower faces of the inwardly projecting portions of such walls, for the purpose described.

31. In a baker's oven, the combination of a baking chamber, tracks extending along the side walls of the chamber, an endless traveling conveyor supported by the tracks, means arranged above and below the upper run of the conveyor for heating the chamber, the side walls of said chamber above the conveyor being spaced a distance less than the width of the conveyor, and lining plates on the side walls of the baking chamber above the conveyor having their lower edges extending downward into close relation to the body of the conveyor inside of the vertical planes of contact between the conveyor and tracks, for the purpose described.

In testimony whereof I have hereunto set my hand.

CORRY B. COMSTOCK.